United States Patent [19]

Scieur

[11] 4,390,759
[45] Jun. 28, 1983

[54] TILT-SENSITIVE IGNITION SWITCH

[76] Inventor: Roger Scieur, Etoges, 51270 Montmort Lucy, France

[21] Appl. No.: 255,040

[22] Filed: Apr. 17, 1981

[30] Foreign Application Priority Data

May 21, 1980 [FR] France .................. 80 11307

[51] Int. Cl.³ .................. H01H 35/02
[52] U.S. Cl. .................. 200/52 A; 200/61.47
[58] Field of Search .................. 200/52 A, 61.47, 183, 200/190, 214, 220, 221, 228, 236

[56] References Cited

U.S. PATENT DOCUMENTS

| 2,588,424 | 3/1952 | Speaker | 200/61.47 |
| 3,371,171 | 2/1968 | Gregory | 200/61.47 X |
| 3,743,802 | 7/1973 | Avenick | 200/61.47 |
| 3,789,170 | 1/1974 | Ferrario | 200/61.47 |
| 3,973,092 | 8/1976 | Breed et al. | 200/61.47 |

Primary Examiner—J. R. Scott
Attorney, Agent, or Firm—Fidelman, Wolffe & Waldron

[57] ABSTRACT

The device is adapted to break the circuit of the electrical system of the vehicle in the event of a tipping or overturning of the latter. The device comprises an elongated body containing two spaced-apart electrodes which are respectively connected to the positive terminal of the battery of the vehicle and to at least some of the electrical control or driving elements of the vehicle. The body contains an electrical conductive fluid in which the electrodes are immersed and is upwardly extended by two tubes which are perpendicular to the body and are interconnected in their upper part by a transfer pipe. A region of transition, located in the region of the connection of the body to the two tubes, is closed by a retarding diaphragm provided with a calibrated orifice. When the vehicle assumes an unusual inclination due to a tipping or overturning thereof, the fluid flows from the body into either of the tubes and thus breaks the circuit between the two electrodes.

4 Claims, 1 Drawing Figure

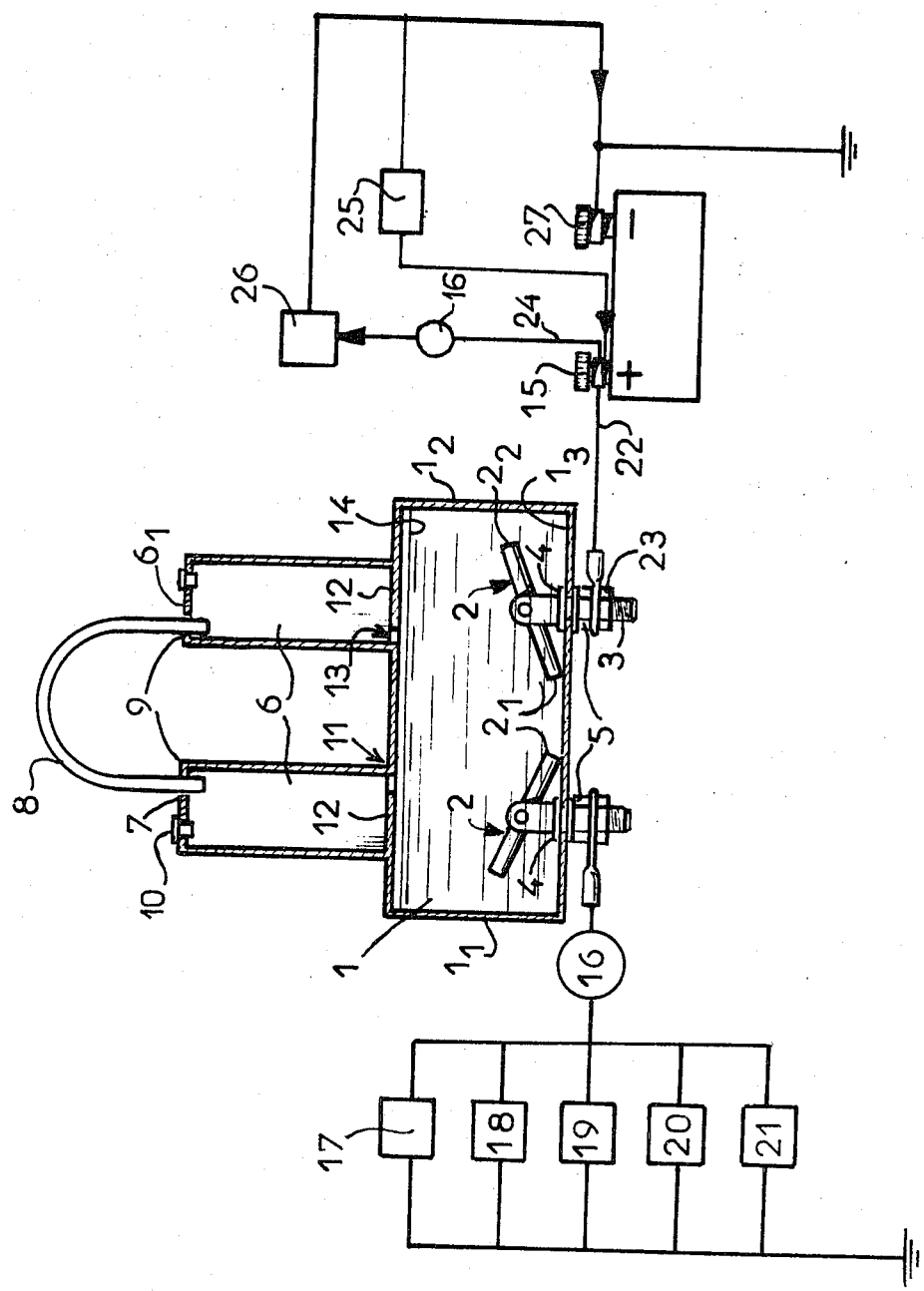

TILT-SENSITIVE IGNITION SWITCH

BACKGROUND AND SUMMARY OF THE INVENTION

The invention relates to a circuit-breaker device applicable to the electrical systems of mobile machines such as vehicles and in particular automobile vehicles.

Automobile vehicles are vulnerable in the event of an accident owing to the fact that all the conditions for an immediate and sudden ignition of the drive unit are united, in particular in the case of tipping or overturning, owing to the presence of inflammable fuel and the ignition of this fuel by the spark-producing electric circuit.

The invention consequently concerns a device which is capable of automatically neutralizing one of these two components in the event of a tipping or overturning of the vehicle as a result of an accident and, in particular, the putting of the electric system out of circuit by immediately breaking this circuit so as to neutralize the electric equipment and stop the motor.

However, and in order to ensure that this device is not brought into action merely by the vibrations of the vehicle or the centrifugal force produced in sharp bends in the road, the device comprises means for retarding this coming into action so that the device is actuated only beyond an acceptable threshhold, for example when the vehicle assumes an unusual longitudinal or transverse inclination.

According to the invention, there is provided a circuit-breaker device applicable in particular to automobile vehicles, this device being adapted to break the circuit of the electrical system of the vehicle when the vehicle tips or overturns, said device comprising an elongated body containing two spaced-apart electrodes respectively connected to the positive terminal of the battery and to the various electrical control and driving elements of the vehicle, said body containing a conductive fluid in which the electrodes are immersed and being upwardly extended by two tubes which are perpendicular to said body and are interconnected in their upper part by a transfer pipe, the transition zone, located in the region of the connection of the body to the two tubes, being closed by a retarding diaphragm provided with a calibrated orifice.

In one embodiment of the invention, the body is formed by a pipe of circular section closed at each end, the two tubes completing this body also being of circular section and of a diameter substantially equal to the diameter of the body.

According to a feature of the invention, the orifice of each of the retarding diaphragms is located in the vicinity of the peripheral edge of the latter, the two orifices being contained in the same diametral plane on edge portions of the diaphragms which are adjacent to each other.

A BRIEF DESCRIPTION OF THE DRAWING

A circuit-breaker device according to the invention is shown by way of an example, to which the scope of the invention is not intended to be limited, in the accompanying single FIGURE which is a diagrammatic view of the electric circuit in which this device is inserted.

DETAILED DESCRIPTION OF THE INVENTION

The circuit-breaker device according to the invention comprises an elongated main body 1 of tubular section of which the two ends $1_1$-$1_2$ are closed. This body contains two electrodes 2, formed by copper bars which are good conductors of electricity, these bars being inclined towards each other so that their adjacent ends $2_1$ are substantially at the level of the bottom $1_3$ of the body, whereas the opposite ends $2_2$ are substantially projecting from the bottom of the body. The electrodes are fixed inside the main body by means of studs 3, sealing rings 4 and 5 being provided inside and outside the body and tightened against the wall of the body by a nut 5.

The main body, which occupies a substantially horizontal position relative to the chassis of the vehicle, is upwardly extended by two tubes 6 of circular section the diameter of which is close to that of the main body. These two tubes may be secured to the body by welding, solering adhesion, a force fit or screwing. The upper end wall $6_1$ of the two tubes 6 is provided with an orifice 7 in which there are engaged the two end portions of an air transfer pipe 8 which puts the two tubes 6 in communication with each other. This transfer pipe avoids an accumulation and compression of air in the tubes 6 when the mercury enters therein, so that the entry of mercury is facilitated, since the air is expelled from one tube to the other by way of the transfer pipe 8. The orifices 7 are contained in the same diametral plane and are located in the vicinity of the inner edge 9 of the tubes 6. This end wall $6_1$ also has another orifice 10 closed by an air pervious plug, for example of felt, so that any compression or depression within the device is avoided. In the region of the junction 11 between the main body 1 and the tubes 6 there are fixed retarding diaphragms 12 which are contained in a substantially horizontal plane parallel to the bottom $1_3$ of the body. Each of the diaphragms is provided with a calibrated flow-retarding orifice 13 contained in the same diametral plane as the other diaphragm, these orifices having a position similar to that of the orifices 7 receiving the transfer pipe 8. As can be seen in the FIGURE, these orifices 13 are located on the edge of the diaphragms and are eccentric with respect to the axis of the tubes 6.

The main body 1 contains a conductive liquid, for example mercury, in which the two electrodes 2 are immersed. The level of the mercury is shown at 14. Thus practically the whole of the volume of the body 1 is filled with mercury.

The circuit-breaker device according to the invention is interposed between the positive terminal 15 of the battery and the electrical equipment of the vehicle comprising in particular, beyond the contact key 16, relative to the positive terminal 15, the ignition system 17, the headlights 18, the windshield wipers 19, the signalling lights 10, the radio 21, etc. The connection to the positive terminal 15 is divided into two branches, the branch 22 which leads to the circuit-breaker and is connected to the electrodes 2 by the nuts 23, the branch 24 which leads to the starter 25 and the generator 26 which are isolated from the remainder of the electrical equipment which is supplied with power through the wire 22. The negative terminal 27 and the various aforementioned elements are connected to ground, formed by the chassis, in the conventional manner.

The device operates in the following manner:

In normal operation of the vehicle, the electric current, supplied by the battery through the conductor 22, normally supplies power to the whole of the electrical equipment of the vehicle, including the contact and the motor, owing to the fact that the mercury contained in the main body 1 and in which the two electrodes are immersed, ensures the electric continuity between these electrodes. In the event of an accident, when the vehicle assumes an unusual longitudinal or transverse inclination as a result of a tipping or overturning of the vehicle, the circuit-breaker device, which is rigid with the chassis of the vehicle or with one of the fixed elements of the latter, assumes an inclination corresponding to that of the vehicle and this causes the mercury contained in the main body 1 to flow into one of the tubes 6 by way of one of the calibrated orifices 13. Owing to the fluidity of mercury, this transfer from the main body to the tubes will occur rapidly so that, within a short period of time, the amount of mercury contained in the main body, and above all the inclination of this body, is such that one of the two electrodes ceases to be immersed in the mercury and immediately breaks the electric circuit and correspondingly stops operation of all the electrical elements on the side of the circuit-breaker device remote from the battery terminal 15. Thus, as the motor has stopped and all the electrical elements have been put out of action, there is no longer any danger of ignition of any escaping fuel and consequently no danger of fire.

The diaphragms 12 located at the base of the tubes 6 constitute means for retarding the action of the device, in particular to avoid operation of the device merely due to the vibrations of the vehicle or to centrifugal force produced when the vehicle travels through sharp bends in the road. Indeed, it is only when the vehicle becomes inclined beyond an acceptable threshhold, as in the case of overturning, that the mercury escapes from the main body 1 and enters the tubes 6. This delay or retarding action is the result of, on one hand, the diaphragms 12 and, on the other hand, the position of their respective orifices 13 and the inclination of the electrodes 2.

The device is automatically put back into its normal state when the vehicle has been put back into its normal position on the road, by the flowing of the mercury from the tubes 6 into the main body 1 or by the transfer of the mercury from one tube to the other by way of the connecting pipe 8 located at the upper ends of the tubes.

The device may be located either in a transverse plane perpendicular to the longitudinal plane of the vehicle, or in this longitudinal plane or in an intermediate plane which makes an angle of less than 90° with the longitudinal plane.

The device may be made in one piece or in two parts, in which case the tubes are secured to the body by adhesion, a fitting together or a screwed connection. The component parts of the device are made from polyvinyl chloride (PVC) which is compatible with mercury.

Note that the starter motor 25 may also be supplied with power through the circuit-breaker device so as to avoid the usual electric losses. However, this arrangement is not essential, since the large-section cable which supplies power to the starter is short and usually well-protected between the motor and the chassis, so that the described arrangement illustrated in the FIGURE may be used with no great inconvenience. On the contrary, it is of interest, since it avoids losses and consequently facilitates starting up in particular in cold weather.

It will be observed that it is on the other hand very advantageous to connect up the generator 26 in accordance with the arrangement described hereinbefore independently of the circuit-breaker device, since, with this arrangement, the primary circuit (coil) is only supplied with power by way of the circuit-breaker device so that, as soon as the latter comes into action, the motor stops immediately.

I claim:

1. An automotive ignition cutoff device for preventing a fire or explosion by interrupting at least a portion of the electrical system of a vehicle in the event of overturning or tipping of the vehicle, and comprising:
   an elongate hollow body;
   at least two conductive studs extending through a wall of said body and sealingly attached thereto, and electrodes attached individually and respectively to each of said studs, said electrodes disposed within said body in a spaced apart relation and said studs connected within said electrical system to provide an electrical circuit discontinuity between one terminal of a battery and a remaining portion of said electrical system;
   an electrically conductive fluid disposed within said body and means for electrically connecting said electrodes by said fluid and completing said circuit according to an orientation of said vehicle within a tilt threshold and for electrically disconnecting said electrodes and interrupting said circuit according to an orientation of said vehicle beyond said tilt threshold;
   tubes connected to said body, each of said tubes having an axis generally perpendicular to an axis of said body and communicating on one end with an interior of said body via a calibrated orifice generally opposite of said body axis from said respective electrode, said tubes communicating with each other on another end via an air transfer tube; and
   an air pervious plug in each of said tubes, said plugs providing means for preventing compression and depression within said device;
   whereby air is allowed to pass through said plugs and fluid is not allowed to pass therethrough so that, upon turning said device upside down, said fluid may flow smoothly according to the calibration of said orifices.

2. A device as in claim 1, wherein said fluid substantially fills said body.

3. A device as in claim 1, wherein said body is nonconductive and said electrodes are inclined relative to a bottom of said body in two opposite directions such that an end of each of two electrodes is in contact with said body and close to each other and another end of each of said two electrodes is spaced from said bottom and remote from each other.

4. A device as in claim 1, wherein said fluid is mercury.

* * * * *